DE WITT C. PRESCOTT.
VALVE CONTROLLER.
APPLICATION FILED MAR. 13, 1913.
1,142,054.
Patented June 8, 1915.
2 SHEETS—SHEET 2.
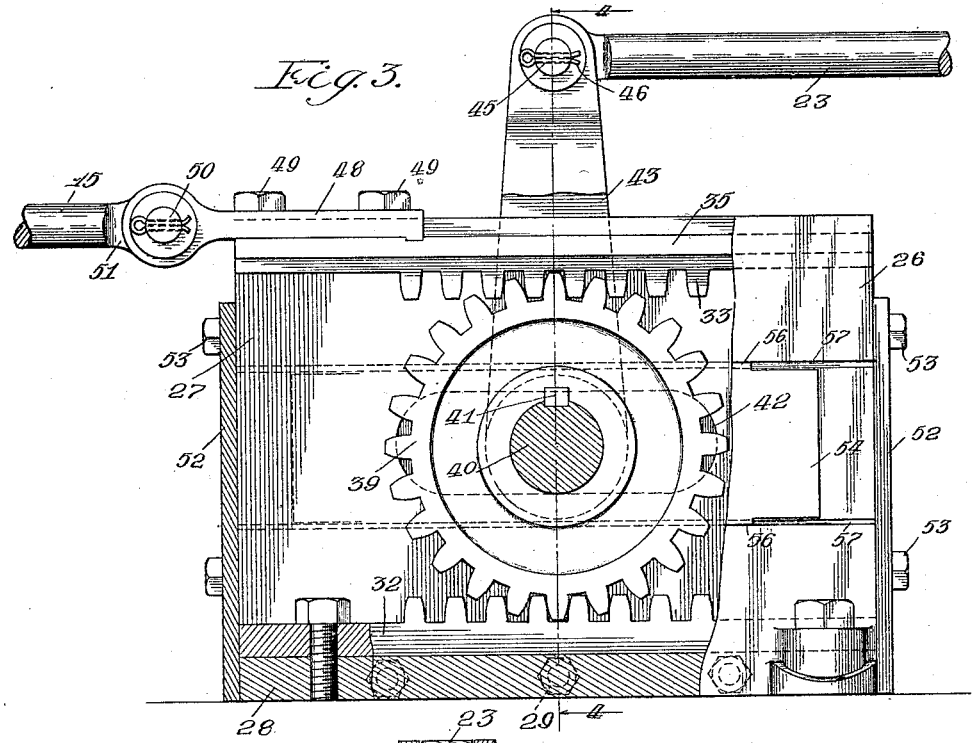
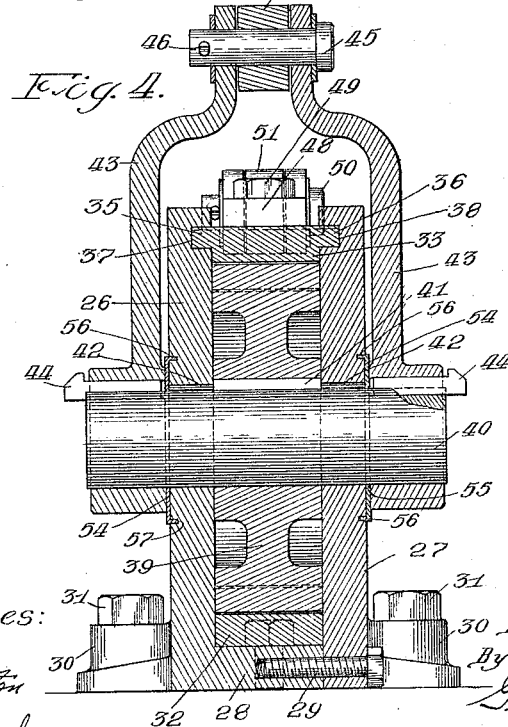

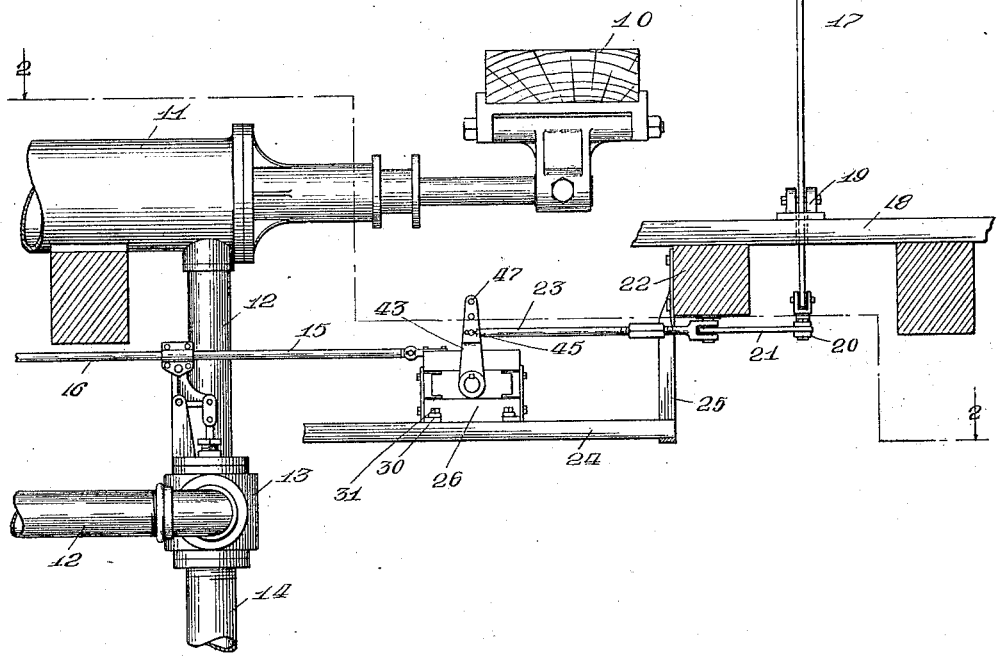
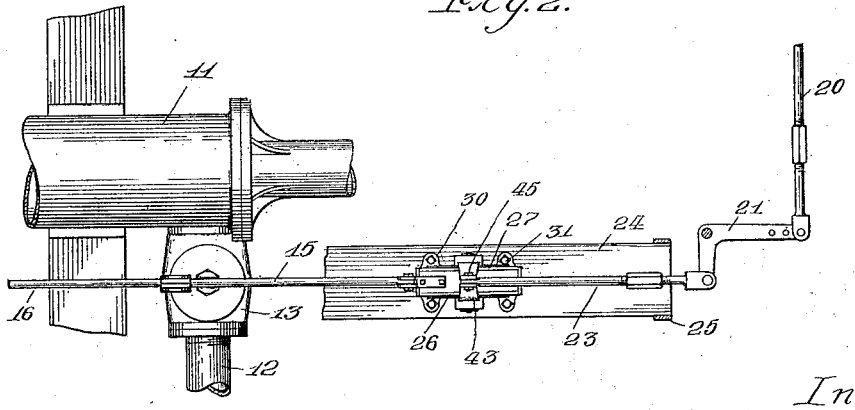

UNITED STATES PATENT OFFICE.

DE WITT C. PRESCOTT, OF CHICAGO, ILLINOIS.

VALVE-CONTROLLER.

1,142,054.   Specification of Letters Patent.   Patented June 8, 1915.

Application filed March 13, 1913. Serial No. 753,896.

*To all whom it may concern:*

Be it known that I, DE WITT C. PRESCOTT, a citizen of the United States, and resident of Chicago, county of Cook, and State of Illinois, have invented certain new and useful Improvements in Valve-Controllers, of which the following is a specification, and which are illustrated in the accompanying drawings, forming a part thereof.

The invention relates to valves for steam cylinders, and more particularly to those constructed to be manually operated.

The object of the invention is to provide means designed to permit the operator of such valves to more efficiently control the flow of fluid through the valve.

The invention is exemplified in the structure to be hereinafter described, and which is illustrated in the accompanying drawings, wherein—

Figure 1 is a detail side elevation, partly in section, of a certain saw mill apparatus embodying a form of valve controller provided by the invention; Fig. 2 is a detail plan view of the same viewed from the line 2—2 of Fig. 1; Fig. 3 is a side elevation of the improved controller, some of the parts being broken away and others being shown in section; and Fig. 4 is a sectional view taken on the line 4—4 of Fig. 3.

A detail of a steam operated saw mill carriage is shown in the drawings at 10. The steam cylinder for the carriage is indicated at 11. Only one end portion of the steam cylinder is shown. A steam supply pipe leading to such end of the cylinder appears at 12. The valve for controlling the same is shown at 13. A detail of the exhaust pipe is shown at 14.

The valve 13, as shown, is of a well known form of construction, and is operated by the usual valve rod 15. Preferably the valve rod 15 is continued beyond the valve 13, as indicated at 16, for connection with a valve (not shown) designed to control the supply of steam to the remote end of the cylinder 11. The operators' hand lever is shown at 17. In the arrangement illustrated this hand lever swings in a plane transverse to the axis of the carriage, 10. As is usual in apparatus of the form shown, the operating handle, 17, extends through the deck, 18, and is pivotally supported thereby, as upon a floor bracket, 19. A rod, 20, is connected to the lower end of the lever 17 and extends to one of the arms of a horizontally swinging bell crank lever, 21. The bell crank lever, 21, may be pivotally secured against the under side of one of the supporting timbers, as 22, of the deck, 18. Its other arm is joined to a rod, 23, whereby such rod is moved by the hand lever, 17, but in the direction in which the valve rod, 15, extends.

In carrying out the invention the apparatus more particularly illustrated in Figs. 3 and 4 of the drawings is employed for operatively connecting the rods 15 and 23. As shown in Fig. 1, this apparatus is supported upon a platform, 24, held in position beneath the deck, 18, in any convenient manner as by brackets, one of which is shown at 25.

A frame, preferably comprising a pair of upright side plates, as 26, 27, is mounted upon the platform, 24. One of these side plates, as 26, is shown as being of L-shape in cross section, and has a horizontal portion, 28, at its lower edge, against which the other side plate, as 27, is secured. Screw bolts, 29, passed through the plate, 27 and into the horizontal portion, 28, of the plate, 26, serve for connecting the plates. For securing the frame in position aperture bracket lugs 30, are formed upon each of the side plates, 26, 27, and screw bolts, 31, are passed downwardly through these bracket lugs into the platform, 24.

A pair of oppositely facing gear racks, 32, and 33, are mounted between the side plates 26 and 27. One of these gear racks is preferably fixed in position as by being bolted to the horizontal portion, 28, of the side plate, 26. The gear rack, 33, is longitudinally movable. To this end it is slidingly supported, as by having lateral extensions 35 and 36 which run in horizontal grooves, as 37, 38, formed in the plates 26 and 27, respectively.

A gear pinion, 39, is mounted between the side plates 26, 27, and engages both of the racks 32 and 33. This gear pinion is shown as being fixed upon a short shaft, 40, as by means of a key, 41. A horizontally extended slot, as 42, is formed in each of the side plates, 26 and 27, for receiving the shaft, 40, and a crank arm, 43, is applied to the shaft, 40, beyond each of the side plates. Each of the crank arms, 43, is fixed upon the corresponding end of the shaft, 40, as by a key, 44. The two crank arms, 43, are arranged in parallel relation and receive the rod, 23, between them adjacent their higher ends. A pin, 45, passed through the crank arms, 43, and through the rod, 23, and secured in position by a cotter, 46, serves for connecting the crank arms with the rod.

Movement of the rod, 23, serves to swing the crank arms 43 and turn the shaft, 40. The gear, 39, is thereby caused to roll upon the fixed gear rack, 32 and move the sliding gear rack, 33. If desired, the turning of the shaft, 40, and consequent rolling of the gear, 39, may be adjusted by shifting the point of connection of the rod, 23, with the crank arms, 43. For this purpose the crank arms, 43, are provided with a plurality of registering apertures, as 47 (Fig. 1), any one of which may receive the pin, 45.

When the crank arms, 43, are connected with the rod, 23, as shown, the movable rack, 33, is preferably connected with the valve rod, 15. To this end an eye-bar 48, is secured against the upper side of the rack, 33, as by screw bolts, 49. A connecting pin, 50, is passed through the eye of the bar, 48, and through a corresponding eye, 51, in the adjacent end of the valve rod, 15.

The movable rack, 33, serves to substantially close the space between the side plates 26 and 27 from above. Preferably cover plates, as 52, are employed for closing this space at the ends. These cover plates are secured against the ends of the side plates, 26, 27, as by screw bolts, 53. Movable cover plates, as 54, serve for closing the slots, 42, against the entrance of dirt about the shaft, 40. Each of these cover plates is fitted about the shaft, as by being provided with a circular aperture, 55, through which the shaft extends and they have inturned flanges, as 56, adjacent their upper and lower edges. These flanges run in horizontal grooves as 57, formed in the outside face of the corresponding side plates, 26, 27. Horizontal movement of the shaft, 40, during the turning of the gear, 39, serves to shift the cover plates, 54. These plates are accordingly made of sufficient length to cover the slots, 42, in any position.

The arrangement provides an increased leverage in moving the valve rod, 15, by the operating handle, 17. The rolling of the gear, 39, between the racks, 32, 33, imparts a smoothness of operation to the parts and enables the operator to have complete control of the movement of the valve rod, 15.

I claim as my invention—

In a valve controller, in combination, a hand lever, a valve rod, a pair of oppositely facing racks, one being fixed and the other being connected to the valve rod, a gear engaging both of the said racks, a crank for turning the gear and connection between the crank and the hand lever.

DE WITT C. PRESCOTT.

Witnesses:
CHARLES B. GILLSON,
E. M. KLATCHER.

Copies of this patent may be obtained for five cents each, by addressing the "Commissioner of Patents, Washington, D. C."